(No Model.)
W. E. JONES.
SCREW CUTTING TAP.
No. 439,956. Patented Nov. 4, 1890.
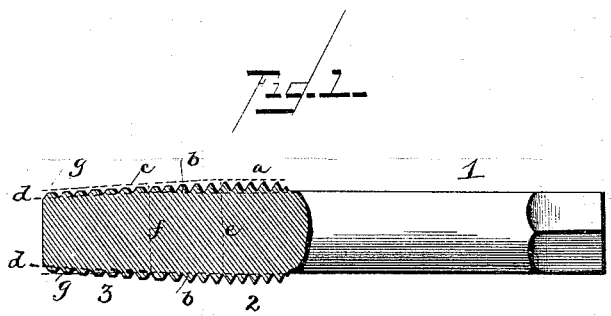
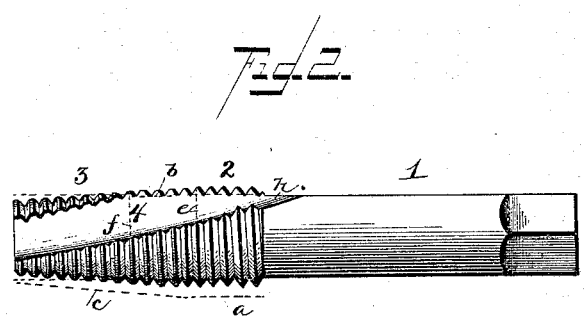
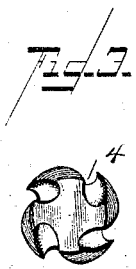
WITNESSES:
INVENTOR:

UNITED STATES PATENT OFFICE.

WILLIS E. JONES, OF ALBA, MICHIGAN.

SCREW-CUTTING TAP.

SPECIFICATION forming part of Letters Patent No. 439,956, dated November 4, 1890.

Application filed June 24, 1890. Serial No. 356,515. (No model.)

*To all whom it may concern:*

Be it known that I, WILLIS E. JONES, a citizen of the United States, and a resident of Alba, in the county of Antrim and State of Michigan, have invented certain new and useful Improvements in Screw-Cutting Taps; and I do hereby declare that the following is a full, clear, and exact description of the invention, which will enable others skilled in the art to which it appertains to make and use the same, reference being had to the accompanying drawings, which form a part of this specification.

My invention relates to improvements in taps for cutting internal screw-threads, the object being to provide an article for this purpose which will more effectually and efficiently perform the work for which it is intended than other such devices now in use.

The invention consists in the novel construction hereinafter fully described, and definitely pointed out in the claim.

In the accompanying drawings, Figure 1 is a sectional view of a tap constructed according to my invention. Fig. 2 is a side elevation of the same. Fig. 3 is an end view.

In the said drawings, the reference-numeral 1 designates the shank of the tap. The cutting portion of the tap consists of a cylindrical upper portion 2 and a conical portion 3, both of which are formed on the shank 1. The particular construction of these parts will be more fully seen in Fig. 1, where the line $a$ designates the outline of the cylindrical portion 2, which is parallel with the axis of the shank; $b$, the parallel base-line; $c$, the conical outline; $d$, the conical base-line; $e$, the peripheral point where the angle in outlines $a$ and $c$ occurs. $f$ designates where angle in base-lines occurs; $g\ g$, dotted lines showing parallel base-lines extended to end of tap, showing the tap to be larger in diameter at parallel base-lines than it is at the end. This is to allow the tap to enter nut with hole smaller in diameter than tap is at parallel base-lines. In case, also, the hole is not quite round, the tap will enter the rim and cut the thread as readily as if the hole is round.

Extending from the end of the tap to the junction of the threaded portion with the shank is a number or series of spiral grooves 4. These grooves run in opposite directions to the threads of the tap. That is to say, if the threads are right-handed the grooves run left-handed, and vice versa. As will be seen in Fig. 3, these grooves are of peculiar formation, so that the points $h$ are in advance of the base of the thread in the revolution of the tap.

In taps as heretofore constructed with the base-line of thread with the axis of the tap many disadvantages are encountered. For instance, the cut across the base of tap-thread is wide, leaving but a very little of the thread in the nut or hole in which the thread is to be cut to lead or draw the tap into the nut, not being sufficient to draw the tap true to lead of thread, causing it to slip back and tear off this slender point of thread, which cannot be replaced because the base-line of the tap is parallel with the axis of the tap. By my invention, however, the slender point of thread is not finished until it reaches the parallel base line at $f$, the base of thread in nut not being finished until it reaches the parallel outline at $e$. The portion from $e$ to shank of tap is to steady the tap while the last of cut is being finished and also to polish the thread in nut or hole.

Having thus described my invention, what I claim is—

A tap for cutting screw-threads, having a conical section and a cylindrical section, said sections being threaded down to base-lines $b$ $d$, the base-line $d$ being conical, while the base-line $b$ is parallel with the axis of the tap, and a series of spiral grooves running oppositely to the threads in the said sections, substantially as described.

In testimony that I claim the foregoing as my own I have hereunto affixed my signature in presence of two witnesses.

WILLIS E. JONES.

Witnesses:
  GEORGE KOONS,
  CHARLES S. JOHNSON.